Figure 1:
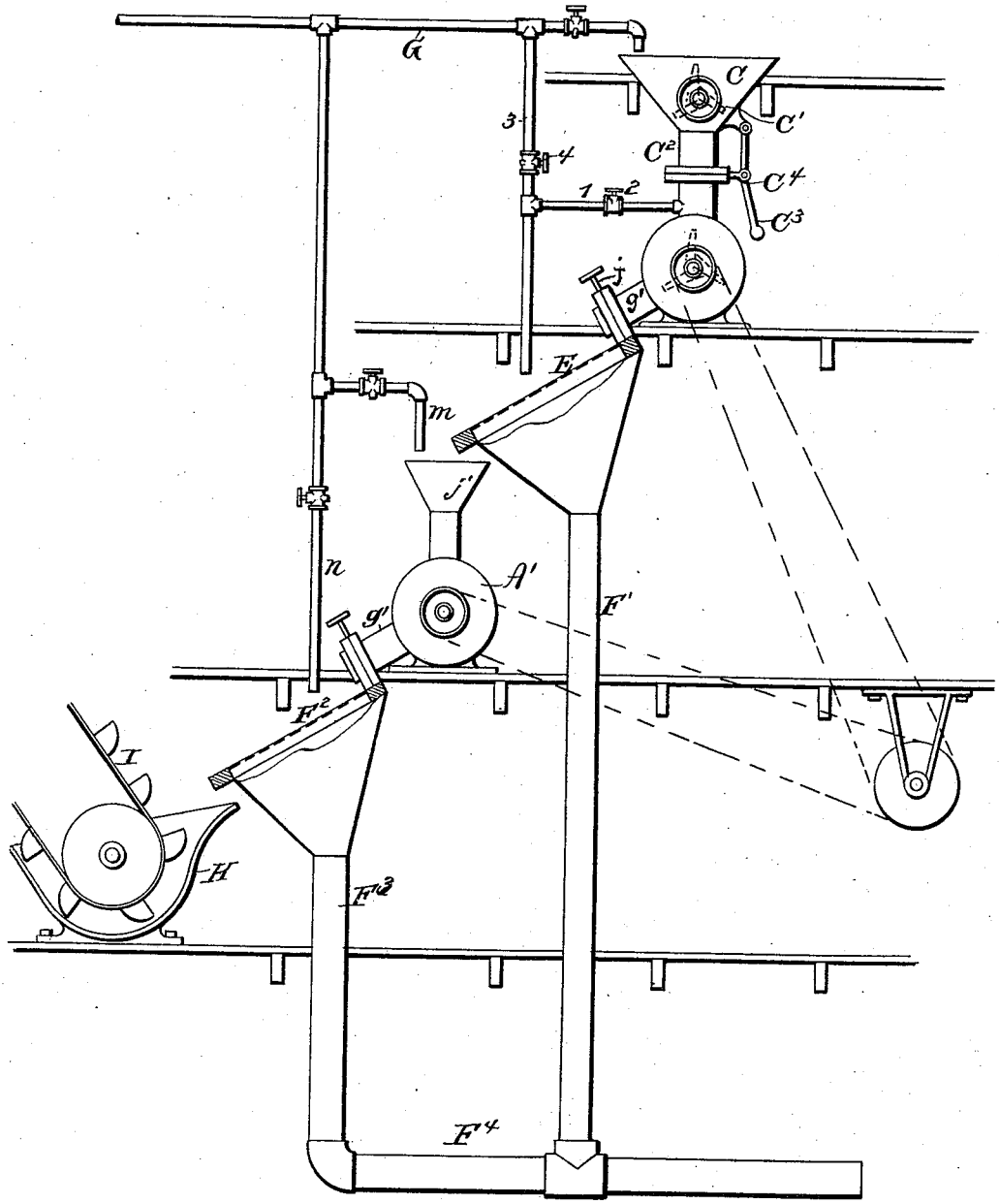

(No Model.) 4 Sheets—Sheet 3.
R. E. ROSE.
PROCESS OF AND APPARATUS FOR WASHING AND DRYING PHOSPHATE ROCK, &c.
No. 485,660. Patented Nov. 8, 1892.
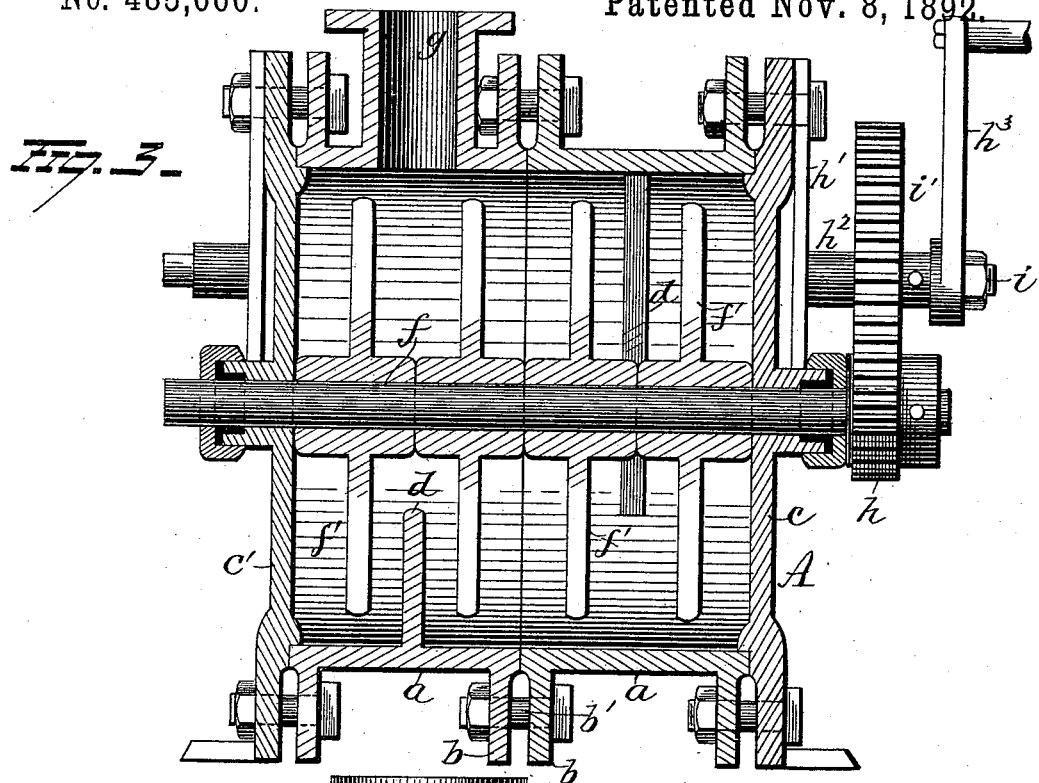
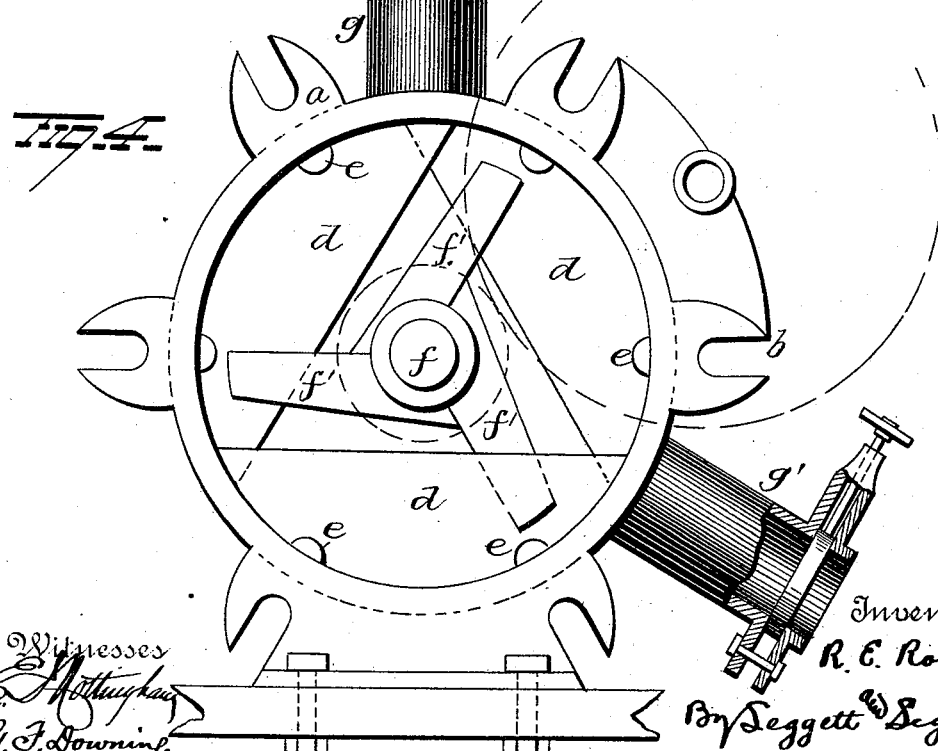
Witnesses
Inventor
R. E. Rose
By Leggett & Leggett
Attorneys

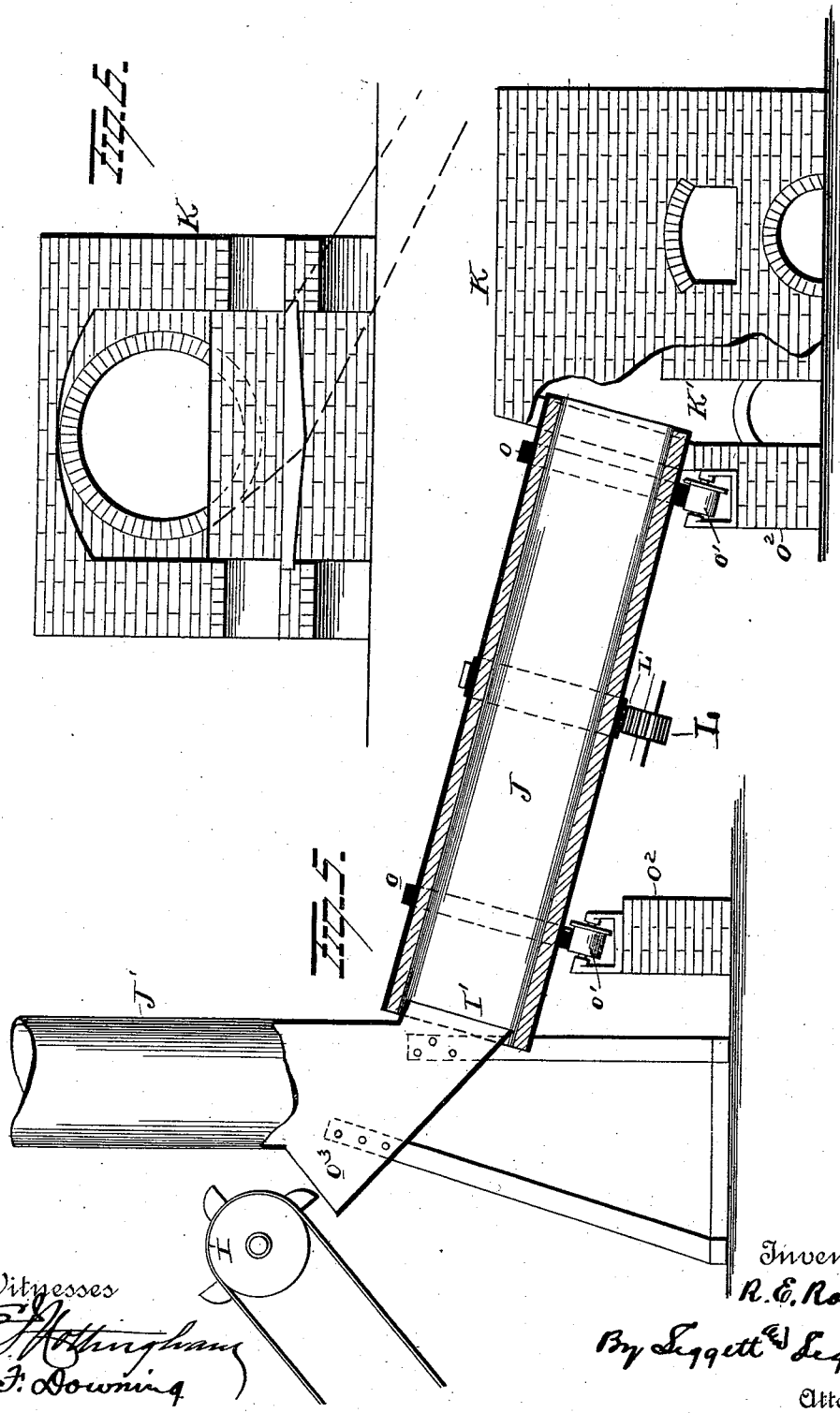

United States Patent Office.

RUFUS E. ROSE, OF KISSIMMEE, FLORIDA.

PROCESS OF AND APPARATUS FOR WASHING AND DRYING PHOSPHATE ROCK, &c.

SPECIFICATION forming part of Letters Patent No. 485,660, dated November 8, 1892.

Application filed April 25, 1891. Serial No. 390,422. (No model.)

*To all whom it may concern:*

Be it known that I, RUFUS E. ROSE, a citizen of Kissimmee city, in the county of Osceola and State of Florida, have invented certain new and useful Improvements in Processes of and Apparatus for Washing and Drying Phosphate Rock, &c.; and I do hereby declare the following to be a full, clear, and exact description of the invention, such as will enable others skilled in the art to which it appertains to make and use the same.

My invention relates to an improvement in apparatus for washing and screening pebbles or other material from its clay, marl, or other matrix, the invention being particularly designed for washing phosphate rock or pebbles from the clay, sand, and marl in which it is generally found.

It is found in practice that the usual forms of washers—such as long open troughs with shafts revolving therein, said shafts being provided with spokes or vanes and running at a comparatively-slow rate of speed with copious amounts of water—do not break up and dissolve the stiff blue clay or marl surrounding the pebble. Particularly do such machines fail to wash out seams of clay or marl contained in the pores and cavities in the rock or pebble. Such machines cannot be run at a great rate of speed, because if so run the material and the water used to wash it would be thrown out by centrifugal force. Other machines similar to "polishing tumbling-cylinders" are used. These machines are also necessarily run at a slow rate of speed, and the material instead of washing out clean accumulates in balls or rolls, embedding the pebbles in the mass. If these machines are driven at a high rate of speed, the whole material will acquire the velocity of the cylinder and revolve with it, held to its interior surface by centrifugal force.

It is the object of my present invention to overcome the objections of prior apparatus and to produce apparatus for washing pebbles by means of which the pebbles will be thoroughly separated from the mass which surrounds them and washed entirely free from said material.

A further object is to so construct the apparatus that the clay, &c., in which the pebbles are contained will be subjected to a great amount of attrition between its particles, and also against the parts of the apparatus to which it is subjected.

A further object is to produce an apparatus for washing and screening pebbles by means of which the material containing the pebbles will not be permitted to form into balls and rolls or allowed to partake of the motion of the apparatus in which they are inserted and by means of which every particle of the clay or marl adhering to the pebbles will be effectually removed.

With these objects in view the invention consists in the combination, with a closed cylinder, of ribs projecting from the interior face of said cylinder, a shaft mounted in the cylinder-heads, and agitators on said shaft, the cylinder being provided at points in proximity to its ends with inlet and outlet openings.

The invention also consists in the combination, with a closed cylinder built in sections, of flanges projecting from the interior wall of the cylinder in line with the longitudinal axis of the cylinder, flanges at right angles to said axis, a shaft mounted in said cylinder, and agitators projecting from said shaft.

The invention also consists in the combination, with a cylinder closed at both ends and provided with inlet and outlet, of flanges projecting from the interior face of said cylinder, a shaft mounted in the cylinder, an inclined sieve adapted to receive the material from the cylinder or agitator, a chute or pipe communicating with said sieve, and means for subjecting the material passing over the sieve to a constant flow of water.

The invention also consists in the combination, with a series of agitators and means for supplying the material to be washed to the first agitator of said series, an inclined sieve arranged in line with the outlet of each agitator, a chute or pipe adapted to communicate with each sieve and receive the refuse material therefrom, and means for supplying a flow of water to said sieves and agitators; and the invention also consists in certain novel features of construction and combination and arrangements of parts, as hereinafter set forth, and pointed out in the claims.

Figure 2:
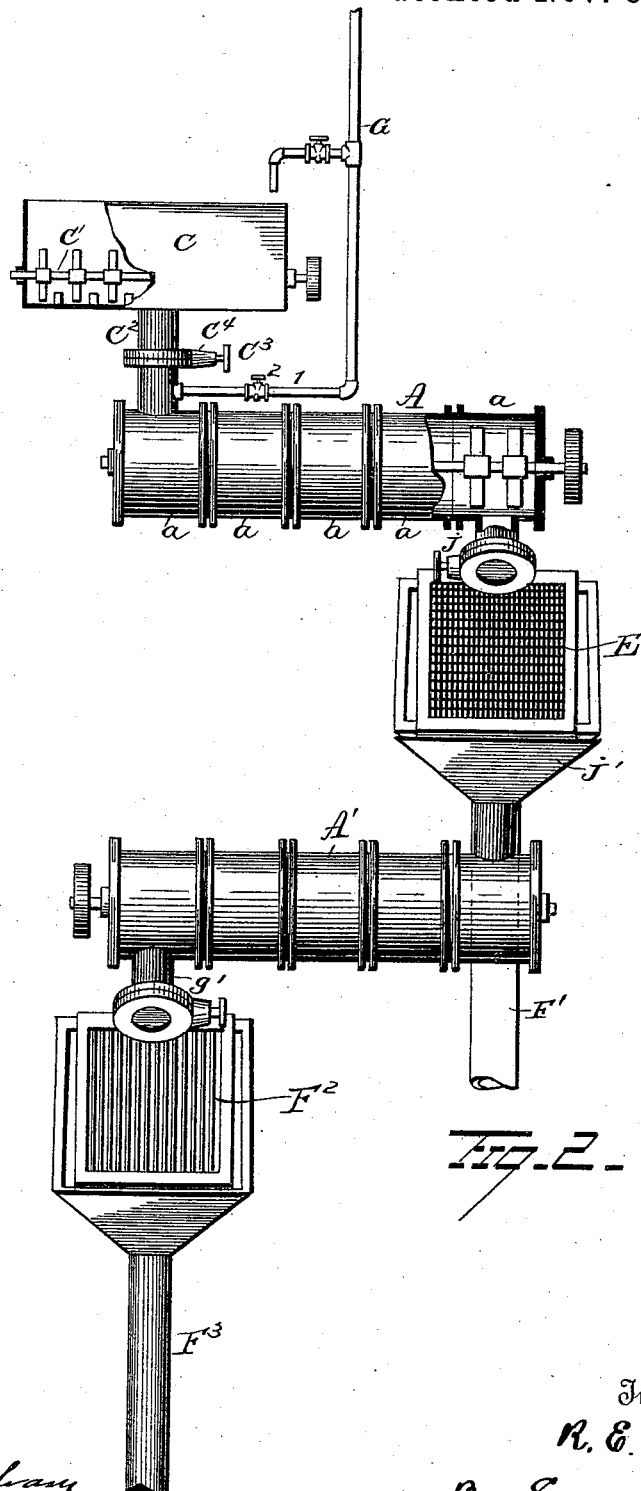

In the accompanying drawings, Figure 1 is an elevation illustrating my improved system of apparatus for cleaning pebbles, &c. Fig. 2 is a similar view taken at right angles to Fig. 1. Fig. 3 is a sectional view illustrating the construction of the agitator-cylinders and means for operating the same by hand. Fig. 4 is an end view of the cylinder with the head removed. Figs. 5 and 6 are separate views of the drier.

A represents a cylinder or agitator which is composed of a series of annular sections $a$, having flanges $b$, through which suitable bolts $b'$ are passed for securing the several sections together. The cylinder A will be composed of a number of sections $a$ commensurate with the amount of work to be accomplished by the machine, and said cylinder is provided at the ends with heads $c\ c'$, said heads preferably being of identical construction. The cylinder is provided internally with segmental stops or flanges $d$, which project inwardly at right angles to the axis of the cylinder, said stops or projections $d$ being cast with the sections or bolted thereto, as desired. These segments are in the general shape of the arcs of circles, and they are arranged as shown in Fig. 4—that is to say, in a spiral or triangular arrangement relative to one another. By virtue of this arrangement of segments and their shape, as well as the relative location of the beaters thereto, the contents of the cylinder is thoroughly stirred and washed during its passage through. The interior of the cylinder is also provided with a series of flanges $e$, extending parallel with the axis of the cylinder. Mounted in the heads $c\ c'$ of the cylinder is a shaft $f$, provided with a series of beaters or agitators $f'$. The cylinder is provided at one end with an inlet-pipe $g$, through which the pebbles mixed with water and adhering marl and clay may be introduced into the cylinder, and at the other end of the cylinder an outlet $g'$ is provided. In the hand-machine shown in Fig. 3 the shaft $f$ is extended somewhat beyond its bearing and provided with a pinion $h$. Secured to the cylinder is a plate $h'$, carrying a sleeve $h^2$, in which the shaft $i$ of a pinion $i'$ is adapted to bear, said pinion $i'$ being adapted to mesh with the pinion $h$ and the shaft $f$ being provided with a crank or handle $h^3$, by means of which to rotate it. A mixture of pebbles, clay, sand, &c., as it is mined and crushed is introduced into the cylinder through the inlet $g$, together with a quantity of water. The material thus introduced is subjected to the action of the beaters $f'$ and forced against the friction plates or flanges $d$ and ribs or flanges $e$ and against the interior of the cylinder, said material being, also, kept in a constant state of attrition and the pebbles thus made to have a rubbing or frictional contact with each other, thereby freeing the adhering clay, &c., from them, being assisted by the action of the water which is introduced into the cylinder, as previously stated.

Having described the construction and explained the operation of a single agitator, I will now proceed to describe the construction and operation of other devices which go to make up my improved apparatus and the relation of the several devices to each other.

C indicates a feeding-hopper in which an agitator C' is located, said hopper being adapted to discharge into a pipe $C^2$, and in this pipe a valve $C^4$ is located and provided with an operating-handle $C^3$. Located beneath the feed-hopper C and adapted to communicate at one end with the pipe $C^2$ is one of the cylinders or agitators A. The outlet $g'$ at the other end of the cylinder or agitator A is provided with a valve $j$, and said outlet is adapted to discharge upon an inclined sieve E, supported in a suitable manner at the top of a pipe or chute F'. The sieve E is adapted to discharge partly-cleaned pebbles into the hopper or inlet $j'$ of a second agitator or cylinder A', similar in all respects to the cylinder or agitator A, above described. The outlet $g'$ of this second cylinder or agitator is also provided with a valve $j$ and adapted to discharge onto a sieve $F^2$, supported at the top of a pipe or chute $F^3$, said pipes being connected with a discharge-pipe $F^4$. The pebbles, marl, clay, sand, &c., are emptied into the feed-hopper C and mixed into a mass with water conducted thereto by a supply-pipe G from any convenient source. This mixture after being made into a mass of about equal consistency throughout is allowed to pass into the first cylinder or agitator A, where it will be subjected to the agitation and attrition hereinbefore explained, a fresh supply of water being permitted to mix with the material as it passes into the cylinder A through a branch pipe 1, having a valve 2, said branch pipe 1 being adapted to communicate with another branch pipe 3, which in turn communicates with the main pipe G, and is provided with a valve 4. The material after being subjected to the action of the cylinder or agitator A, to free the pebbles to some extent from the adhering marl, &c., is permitted to escape through the outlet $g'$ onto the sieve E. In passing over the sieve E it will be subjected to a stream of fresh water from the pipe 3, whereby more of the material adhering to the pebbles will be washed off and the pebbles become comparatively clean. The mud or clay, muddy water, and refuse of all descriptions will pass through the meshes of the sieve E into the pipe or chute F' and be carried off through the discharge-pipe $F^4$. The pebbles thus partially cleaned will pass from the sieve E into the second cylinder or agitator A', together with a quantity of fresh water supplied at the cock or faucet $m$, and will there be subjected to the same treatment as before described, being discharged onto the second inclined sieve $F^2$, where it will be subjected to a fresh supply of water from a pipe or outlet $n$, any clay, &c., still remaining with the pebbles being permitted to escape through the sieve $F^2$ into the pipe or chute $F^3$ and finally out through the discharge-pipe F⁴. The thoroughly-washed pebbles are discharged from the sieve F² into a trough H, where they are taken up by a carrier I and discharged at the mouth I' of an inclined flue or drier J. Right in this connection attention may be called to the fact that all of the parts hereinbefore described are arranged, preferably, in a diagonal manner, as shown in Fig. 1, the object being that in this way the parts may be made more compact and the material may be treated with greater facility and with better results than it could possibly be otherwise, for the reason that all the feed is by gravity, and hence when once the material has been raised and discharged into the apparatus it finds its way through it, and its movement is slow or rapid, accordingly as desired for the best results. The flue or drier J is provided with annular flanges or tracks o and located in a diagonal position on wheels o', mounted in suitable brackets on the tops of suitable structures o² of masonry, said flue being provided at its upper end with an inlet or hopper o³, adapted to receive the material from the conveyer I, and said flue being also provided at its upper end with a stack J'. The lower end is adapted to bear against and communicate with a furnace K. The flue or drier J is adapted to discharge into a chamber or compartment K' in proximity to the fire-box of the furnace, said chamber being preferably provided with an inclined bottom. The heat and flames from the furnace will enter the flue or drier J and strike the upper interior surface of the flue or drier, which drier is lined with fire-brick or other refractory material, said flue being constantly revolved by a pinion L meshing with a rack L' on the flue or by other suitable means. The hot gases and flames will be deflected by the refractory lining of the drier or flue J and made to pass upwardly through the drier, the flue or drier at the same time being slowly rotated to present the material passing through the flue to the heated parts thereof and constantly changing the point on the interior of the flue to the direct heat of the gases and flames from the furnace. The heated gases and flames in their passage through the flue and the heated condition of the interior of the flue itself will burn out any sticks or other vegetable matter which might be mixed with the pebbles, and also serve to thoroughly dry the pebbles by evaporating the moisture contained in and on them.

It is evident that any number of agitators and sieves desired may be employed as occasion may require. It will also be seen that by constructing the agitators or cylinders A as above set forth parts thereof which become worn may be removed and renewed.

Having fully described my invention, what I claim as new, and desire to secure by Letters Patent, is—

1. The combination of a cylinder provided with segmental stops or flanges substantially the shape of segments of a circle, these flanges extending approximately at right angles to the axis of the cylinder and located around the interior in a spiral arrangement, the cylinder also provided with a series of flanges extending parallel with the axis, and a shaft arranged to rotate in the cylinder and furnished with beaters adapted to rotate between the flanges, substantially as set forth.

2. The combination of a cylinder comprising sections secured together, said cylinder provided with segmental stops or flanges arranged spirally in the interior of the cylinder and approximately at right angles to the axis of the cylinder and having flanges extending parallel with the axis, substantially as set forth.

3. The combination, with washing-cylinders arranged one above another and hoppers on each of the cylinders, of screens extending from the discharge of one cylinder to the hopper of the cylinder next below and water-pipes discharging into the hoppers and over the screens, substantially as set forth.

4. The combination, with washing-cylinders and screens, said parts arranged diagonally, of a drier and means for conducting the material from the washers to the drier, whereby the process of washing, screening, and drying is rendered successive and continuous, substantially as set forth.

5. The combination, with two or more washing-cylinders and screens arranged diagonally and the cylinders so constructed that adjacent ones discharge at opposite ends and the screens located at corresponding positions to receive the material as it is discharged from the cylinders, of pipes leading from the screens and pipes discharging into the screens, substantially as set forth.

In testimony whereof I have signed this specification in the presence of two subscribing witnesses.

RUFUS E. ROSE.

Witnesses:
J. E. FOXWORTHY,
P. HANS AGNEW.